US009413659B2

(12) United States Patent
Duminuco et al.

(10) Patent No.: US 9,413,659 B2
(45) Date of Patent: Aug. 9, 2016

(54) DISTRIBUTED NETWORK ADDRESS AND PORT TRANSLATION FOR MIGRATING FLOWS BETWEEN SERVICE CHAINS IN A NETWORK ENVIRONMENT

(71) Applicant: CISCO TECHNOLOGY, INC., San Jose, CA (US)

(72) Inventors: Alessandro Duminuco, Milan (IT); Hendrikus G. P. Bosch, Aalsmeer (NL); Jeffrey Napper, Delft (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 156 days.

(21) Appl. No.: 14/301,767

(22) Filed: Jun. 11, 2014

(65) Prior Publication Data
US 2015/0365323 A1 Dec. 17, 2015

(51) Int. Cl.
*H04L 12/26* (2006.01)
*H04L 12/741* (2013.01)
*H04L 12/801* (2013.01)
*H04L 12/851* (2013.01)

(52) U.S. Cl.
CPC .............. *H04L 45/745* (2013.01); *H04L 47/18* (2013.01); *H04L 47/2441* (2013.01)

(58) Field of Classification Search
CPC ... H04L 12/741; H04L 12/851; H04L 12/801; H04L 45/745; H04L 47/18; H04L 47/2447
USPC ....................................................... 370/235
See application file for complete search history.

(56) References Cited

U.S. PATENT DOCUMENTS

| | | | |
|---|---|---|---|
| 8,396,986 B2 | 3/2013 | Kanada et al. | |
| 8,560,707 B2 | 10/2013 | Jacob et al. | |
| 2003/0065812 A1* | 4/2003 | Beier ................ | H04L 29/12339 709/236 |
| 2010/0014459 A1* | 1/2010 | Mir ................... | H04L 29/12386 370/328 |
| 2013/0151661 A1 | 6/2013 | Koponen et al. | |
| 2015/0334045 A1* | 11/2015 | Tremblay ............... | H04L 45/38 709/226 |

FOREIGN PATENT DOCUMENTS

WO 0056034 9/2000

OTHER PUBLICATIONS

"Chapter 23, Configuring Network Address Translation," User Guide for Cisco Security Manager 4.4, Cisco Systems, Inc., Feb. 2013, 48 pages http://www.cisco.com/c/en/us/td/docs/security/security_management/cisco_security_manager/security_manager/4-4/user/guide/CSMUserGuide_wrapper/NATchap.pdf.

* cited by examiner

*Primary Examiner* — Sai-Ming Chan
(74) *Attorney, Agent, or Firm* — Patent Capital Group

(57) ABSTRACT

An example method for distributed network address and port translation (NAPT) for migrating flows between service chains in a network environment is provided and includes distributing translation state for a flow traversing the network across a plurality of NAPT service nodes in the network, with packets belonging to the flow being translated according to the translation state, associating the flow with a first service chain at a flow classifier in the network, and updating the association when the flow migrates from the first service chain to a second service chain, with packets belonging to the migrated flow also being translated according to the translation state. The method may be executed at a pool manager in the network. In specific embodiments, the pool manager may include a distributed storage located across the plurality of NAPT service nodes.

19 Claims, 7 Drawing Sheets

DISTRIBUTED NETWORK ADDRESS AND PORT TRANSLATION FOR MIGRATING FLOWS BETWEEN SERVICE CHAINS IN A NETWORK ENVIRONMENT

TECHNICAL FIELD

This disclosure relates in general to the field of communications and, more particularly, to distributed network address and port translation for migrating flows between service chains in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for distributed network address and port translation (NAPT) for migrating flows between service chains in a network environment is provided and includes distributing translation state for a flow traversing the network across a plurality of NAPT service nodes in the network, with packets belonging to the flow being translated according to the translation state, associating the flow with a first service chain at a flow classifier in the network, and updating the association when the flow migrates from the first service chain to a second service chain, with packets belonging to the migrated flow also being translated according to the translation state. The method may be executed at a pool manager in the network.

In a general sense, the term "service node" comprises a physical or virtual network element that can provide one or more network services (e.g., NAPT, firewall, Deep Packet Inspection (DPI), Lawful Intercept (LI), etc.) to packets traversing the network. As used herein, the term "network element" is meant to encompass computers, network appliances, servers, routers, switches, gateways, bridges, load balancers, intrusion detection appliances, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. The term "service chain" refers to one or more network services chained (e.g., connected, attached, coupled, etc.) in a specific order to provide a composite service to packets traversing the network.

Example Embodiments

Figure 1:
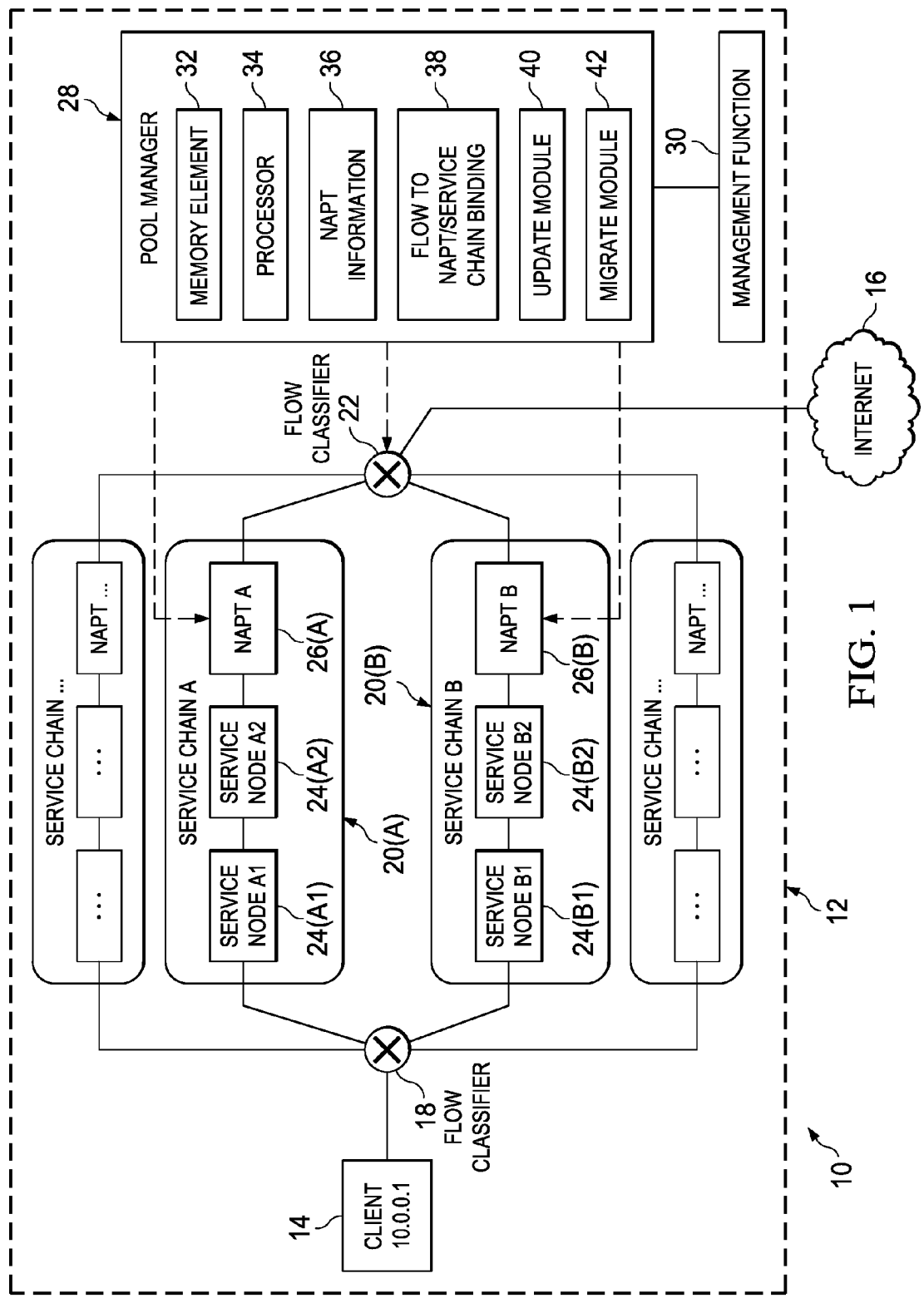
FIG. 1 is a simplified block diagram illustrating a communication system for distributed network address and port translation for migrating flows between service chains in a network environment.

Turning to FIG. 1, FIG. 1 is a simplified block diagram illustrating a communication system 10 for distributed network address and port translation for migrating flows between service chains in a network environment in accordance with one example embodiment. FIG. 1 illustrates a network 12 comprising a client 14 that communicates with another network, such as the Internet 16. A flow classifier 18 may classify flows from client 14 into one or more service chains, for example, service chain 20(A) or 20(B). Another flow classifier 22 may classify flows from Internet 16 into the one or more service chains, for example, service chain 20(A) or 20(B).

The term "flow" can be inclusive of a stream of packets. Substantially all packets belonging to a specific flow may have a set of common properties. Each property can be a result of applying a function to one or more packet header fields (e.g., destination IP address), transport header fields (e.g., destination port number), or application header fields (e.g., real-time protocol (RTP) header fields; one or more characteristics of the packet (e.g., number of multiprotocol label switching (MPLS) labels); or one or more fields derived from packet treatment (e.g., next hop IP address, output interface). In many embodiments, each flow may be identified by a unique 5-tuple, comprising, protocol, source Internet Protocol (IP) address, source port, destination IP address, and destination port. A packet may be characterized as belonging to a particular flow if it satisfies substantially all properties of that flow. For example, packets with the same 5-tuple may belong to a specific flow.

As used herein, the term "flow classifier" refers to an application (e.g., logical entity) executing in a network element that identifies and classifies network traffic (e.g., data traversing the network, usually formatted into packets) to follow different service chains based on pre-configured service characteristics (e.g., 5-tuple, Transmission Control Protocol (TCP) headers, hyper-text transfer protocol (HTTP) headers, etc.) or service policies (e.g., access ports, quality of service, etc.) applied to the network traffic. The flow classifier creates a service path (e.g., a path that flows are forwarded through in a service chain) comprising the series of service nodes that together form the service chain. There may be multiple paths in a particular service chain. Each service chain processes a specific flow of network traffic.

Each service chain 20(A) and 20(B) may comprise one or more service nodes. For example, service chain 20(A) may comprise service nodes 24(A1), 24(A2) and NAPT service node 26(A); service chain 20(B) may comprise service nodes 24(B1), 24(B2) and NAPT service node 26(B). In specific example embodiments, each NAPT service nodes 26(A) and 26(B) may perform NAPT on incoming or outgoing packets of each flow, for example, by translating a private IP address and port into a public IP address and port, and vice versa.

Embodiments of communication system 10 can allow flow migration between service chains (e.g., 20(A), 20(B)) that include NAPT service nodes (e.g., 26(A), 26(B), respectively). The translation state for each flow may be migrated from one NAPT service node (e.g., 26(A)) to another (e.g., 26(B)). According to various embodiments, after migration, return traffic of the migrated flow (e.g., packets returning to the network) hits the correct NAPT service node. A pool manager 28 and a management function 30 may facilitate the operations described herein. In a specific embodiment, pool manager 28 may be configured with a memory element 32, a processor 34, NAPT information 36, a flow to NAPT/service chain binding 38, an update module 40, and a migrate module 42.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network services are widely deployed and essential in many networks. The services can provide a range of functions such as security, wide area network (WAN) acceleration, and server load balancing. Services that form part of an overall composite service may be physically located at different points in the network infrastructure, such as the wide area network, data center, enterprise, campus, etc. For some network services, traffic is forwarded through a sequence of network functions, which usually have dedicated capabilities other than forwarding, e.g. firewall. Forwarding traffic along a sequence of service processing functions is typically based on service characteristics. For example, certain traffic may be directed to a domain border gateway for monitoring and charging; certain other traffic may be steered through a load balancer to distribute performance pressure before forwarding to data center services; mobile network operators may split mobile broadband traffic and steer them along different offloading paths; firewalls may be used to filter traffic for Intrusion Detection System (IDS)/Intrusion Protection System (IPS); security gateways may be used to encrypt/decrypt traffic; certain traffic that traverses different network technology segments such as IPv4/IPv6 may be directed to a carrier grade network address translator (CGNAT); etc.

In a particular example of a service routed infrastructure used by a mobile service provider, the service chain can alter traffic between mobile nodes and remote services. All packets from and to the mobile node are subjected to one or more of these services. Services include mobile line termination, lawful interception, charging, application-specific (in-line) services such as HTTP proxies, TCP optimizers, firewalls and NAPT functions. Migrating flows from one service chain to another may be possible when the service chains are transparent, for example, with packets flowing through the service chains unaltered by the service nodes and in case of TCP, service nodes not breaking the connection, as for example in case of TCP/HTTP proxies.

A common obstacle to flow migration is represented by NAPT service nodes, which are, by definition, non-transparent. One of the main functions of NAT is to enable private IP networks to connect to the Internet. Network address translation replaces a private IP address with a public IP address, translating the private addresses in the internal network into legal, routable addresses that can be used on the public Internet. In this way, NAT conserves public addresses; for example, NAT rules can be configured to utilize only one public address for the entire network in communications with the outside world. As part of the translation process, the NAT appliance (e.g., service node) also records the substitution in a translation database; the records are known as "xlate" entries. The appropriate xlate entry must exist to allow address translation on return packets—the substitution of the original real address for the mapped address sometimes referred to as "untranslation." Thus, NAT actually consists of two steps: translation of a real (e.g., private) address into a mapped (e.g., public) address, and reverse translation for returning traffic.

If the source port remains unmodified, the function is usually referred to as NAT and implies one-to-one mapping between the real and the mapped IP addresses. The typical scenario, however, is that many real IP addresses are translated into fewer mapped IP addresses; thus, a one-to-many mapping is used between the real and the mapped IP addresses. Such mapping is realized with a NAPT function, which also applies port address translation (PAT) in addition to NAT; thus, many flows with different source private IP addresses can be mapped into one source global IP address with correspondingly different source ports.

Whereas NAT provides a globally unique address for each outbound host session, PAT provides the same single address combined with a unique port number, for several simultaneous outbound or inbound host sessions. The NAPT service node translates a real source IP address (e.g., a private IP address that is not routable on the Public Internet) and source port into a mapped source IP address (e.g., routable public IP address) and source port.

The global mapped addresses used for NAT by a particular NAPT service node are chosen from a pool of addresses specifically designated for address translation and assigned to the particular NAT service node. In a general sense, a network administrator defines the pool by specifying a range of addresses and giving the range a unique name. The unique global address used for PAT can be either one global address, or the IP address of a given interface. The NAPT service node translates an address when an existing NAT rule matches the specific traffic.

The NAPT translation is applied to all outgoing packets (e.g., packets moving out of the network) of a given flow and the translated global IP address is the address by which a subscriber inside the network is known on the Internet. When return traffic destined to the assigned global IP address hits the NAPT service node, the NAPT service node translates the global IP address back to the real IP address before forwarding the packets to the subscriber. Flows traversing a specific NAPT service node remains tied to the NAPT service node.

Any attempt to migrate the flow from one service chain to another service chain having a different NAPT function can cause the subscriber to be assigned to a different mapped IP address, breaking the connection (if any) between the flow and the translated global IP address and preventing the return traffic from correctly returning to the subscriber. The problem can arise when the different NAPT service node of the migrated service chain translates the real IP address into a different global IP address, based on the particular (different) address pool used by the service node. As a result, the returning traffic having the different global IP address is not identified after the migration as belonging to the same flow prior to migration.

Communication system 10 is configured to address these issues (among others) to offer a system and method for distributed network address and port translation for migrating flows between service chains in a network environment. According to various embodiments, pool manager 28 may distribute the translation state for a flow traversing network 12 across a plurality of NAPT service nodes 26(A) and 26(B) in network 12, with packets belonging to the flow being translated according to the translation state. As used herein, the term "translation state" comprises a mapping between a real (e.g., local/private) address and port before translation to a mapped (e.g., global/public) address and port after translation. The translation state and the associated NAPT service node identity may be stored in NAPT information 36. Pool manager 28 may associate the flow with service chain 20(A) at flow classifier 22, for example, using information stored in flow to NAPT/service chain binding 38. In various embodiments, flow to NAPT/service chain binding 38 may comprise an association between the flow and the NAPT service node owner, or the service chain to which return packets should be forwarded. Update module 40 may update the association when the flow migrates from service chain 20(A) to service chain 20(B), with packets belonging to the migrated flow also being translated according to the translation state.

Embodiments of communication system 10 may allow NAPT service nodes (e.g., 26(B)) to take over the translation state for a given flow from other NAPT service nodes (e.g., 26(A)). In some embodiments, the taking over can be implemented by a direct signaling between NAPT service nodes 26(A) and 26(B). In other embodiments, the taking over can be implemented by storing the translation state in an external (e.g., distributed) storage (e.g., pool manager 28), which can move ownership of the flow from one NAPT service node (e.g., 26(A)) to another NAPT service node (e.g., 26(B)). Additionally, when the translation state is migrated from one NAPT service node to (e.g., 26(A)) to another NAPT service node (e.g., 26(B)), the global IP address and port used in the translation may be migrated to ensure that return traffic is sent to the correct NAPT service node (e.g., 26(B)) after flow migration. In various embodiments, migrate module 42 in pool manager 28 may receive notification (e.g., from management function 30) of the migration and trigger updating of flow to NAPT/service chain binding 38 and assigning of the translation state to the migrated NAPT service node.

According to an example embodiment of communication system 10, NAT migration may be realized by means of gratuitous address resolution protocol (GARP), which triggers a change in an ARP table of all other hosts in the same Layer-2 (L2) domain, assuming that the NAPT service nodes 26(A) and 26(B) are connected to the same L2 domain. The mechanism may be similar to existing technologies that use gratuitous ARP, for example, with Hot Standby Router Protocol (HSRP) or Virtual Router Redundancy Protocol (VRRP). In another example embodiments, a border gateway protocol (BGP) router may be used in front of NAPT service nodes 26(A) and 26(B). A suitable advertisement sent to the BGP router (via BGP) may include the appropriate NAT service node (e.g., 26(A) or 26(B), depending on flow migration state) as next hop for reaching the IP addresses currently associated to the flow being migrated. Such a mechanism may be similar to existing implementations of BGP routers, applied in a NAPT context.

In case of NAPT, with PAT implemented in addition to NAT, according to an embodiment of communication system 10, the flows that potentially may migrate may be pre-selected for the NAT function rather than the NAPT function. NAPT may be continued to be used for other flows that are not potential candidates for migration. According to another embodiment of communication system 10, flow classifier 22 may be used northbound (e.g., towards Internet 16, and away from client 14) of NAPT service nodes 26(A) and 26(B). Flow classifier 22 may deliver return packets to the appropriate NAPT service nodes 26(A) or 26(B) based on a full 5-tuple identifying the flow instead of simple IP addresses.

Update module 40 of pool manager 28 may notify flow classifier 22 about the flow migration; flow classifier 22 may adjust its routing tables accordingly. According to various embodiments, to cope with misrouted packets (e.g., packets that are wrongly sent to the pre-migration NAPT service node), the pre-migration NAPT service node (e.g., 26(A)) may forward the packets to the post-migration NAPT service node (e.g., 26(B)). In some embodiments, a shared pool of global IP addresses may be assigned to NAPT service nodes (e.g., 26(A), 26(B), etc.) in network 12. The shared pool may be administered by pool manager 28. In some embodiments, pool manager 28 may use a Dynamic Host Configuration Protocol (DHCP) server to administer the pool of IP addresses.

When NAPT service node 26(A) receives the first packet of a new flow F, it may request pool manager 28 for a new pair of global IP address and port (e.g., {public IP address, port}). Pool manager 28 may return a pair of global IP address and port is not currently used by any other NAPT service node and store the mapping information (e.g., {public IP address, port}) comprising the translation state along with the NAPT service node identity in NAPT information 36. In some embodiments, NAPT information 36 may comprise a local database. NAPT information 36 may indicate that the pair of {public IP address, port} is in use and assigned to NAPT service node 26(A). NAPT service node 26(A) may perform the translation according to the mapped pair of global IP address and port and store the translation state locally. The translation state may include a mapping between a 5-tuple identifying the flow to the translated IP address and port: {protocol(F), original_source_IP(F), original_source_port (F), destination_IP(F), destination_port(F)}→{translated_source_IP(F), translated_source_port(F)}. Service node 26(A) may start replying to ARP requests on an external interface for the translated IP address (e.g., translated_source_IP(F)). In embodiments wherein the BGP router is used, service node 26(A) may advertise to the BGP router that the source IP address is reachable through the external IP address of NAPT service node 26(A).

Management function 30 may migrate flow F from service chain 20(A) to another service chain 20(B). In embodiments where NAPT service node 26(A) performs only NAT function, migrate module 42 of pool manager 28 may notify NAPT service node 26(B) to be newly responsible for flow F. Pool manager 28 may send the translation state (e.g., including translation tuple) to NAPT service node 26(B). Pool manager 28 may also store the translation state and service node identifying information in NAPT information 36. Service node 26(B) may send a GARP message comprising the translated IP address of flow F and a media access control (MAC) address of the external interface of NAPT service node 26(B). The GARP message may trigger an ARP table update in all the hosts in the L2 domains to which NAPT service node 26(B) is connected, similar to HSRP or VRRP. The ARP table update can ensure that return traffic for flow F is sent to NAPT service node 26(B) instead of NAPT service node 26(A).

In embodiments where the BGP router is used in front of NAPT service node 26(B), management function 30 may advertise to the BGP router that the source IP address of flow F is reachable through the external IP address of NAPT service node 26(B). Pool manager 28 may notify NAPT service node 26(A) that flow F has been taken over by NAPT service node 26(B). Management function 30 may migrate flow F from service chain 20(A) to service chain 20(B). NAPT service node 26(B) may start translating the packets for flow F according to the translation state received from pool manager 28.

In embodiments where NAPT service node 26(A) applies the full NAPT function, flow classifier 22 may intercept packets between the NAPT service nodes (e.g., 26(A), 26(B), etc.) and Internet 16. Flow classifier 22 may receive the packets destined to Internet 16 from substantially all NAPT service nodes in network 12 and forward them appropriately. Flow classifier 22 may locally store (e.g., in a local flow table) the mapping between source NAPT service nodes and each observed flow. When packets return from Internet 16, flow classifier 22 may deliver them to the appropriate NAPT service node according to the locally stored data (e.g., data in the flow table).

In case of flow migration, pool manager 28 may notify NAPT service node 26(B) to be newly responsible for flow F; pool manager 28 may send the translation state (e.g., translation tuple F) to NAPT service node 26(B). Pool manager 28 may store the association between the translation state and the newly responsible NAPT service node identity in NAPT information 36. Pool manager 28 may inform flow classifier 22 of the change in the flow ownership. Flow classifier 22 may modify its local flow table accordingly. Pool manager 28 may notify NAPT service node 26(A) that flow F has been taken over by NAPT service node 26(B). Management function 30 may move the flow F from service chain 20(A) to service chain 20(B). NAPT service node 26(B) may start translating the packets for flow F according to the translation state (e.g., translation tuple) received from pool manager 28.

It may be understood that upon flow migration from service chain 20(A) to service chain 20(B), some packets may be already travelling in service chain 20(A), which can imply that after migration, NAPT service node 26(A) may erroneously continue to receive packets from the subscriber on flow F. It may be also understood that the other hosts may ignore the GARP message or delay the ARP table update or flow classifier 22 router can fail to update the flow table in a timely manner. Any number and type of network errors may disrupt the flow of packets in the service chain, and result in the wrong service node receiving packets of flow F. Such misrouting events may be handled by allowing NAPT service node 26(A) to forward misrouted packets to NAPT service node 26(B) after the migration. The forwarding can happen using a dedicated interface between the NAPT service nodes 26(A) and 26(B) or any tunneling mechanism.

In some embodiments, any NAPT service node that receives packets not belonging to flows locally owned may request pool manager 28 for the owner NAPT service node. Pool manager 28 may respond to the query with the identity of the relevant NAPT service node. The requesting NAPT service node may subsequently forward the packets accordingly. Note that there is no requirement that the NAPT service nodes (e.g., 26(A), 26(B), etc.) reside at the end of the corresponding service chains (e.g., 20(A), 20(B), etc.) If the NAPT service nodes are not the last service nodes in the service chain, then the migration functionality may be located at the last service node in the chain. For example, if the GARP mechanism is used, the last service node in the service chain may send the message to attract return packets for the migrated flow; alternatively, flow classifier 22 may point to the last service node of the destination service chain.

In some embodiments, pool manager 28 may be implemented as a distributed storage. For example, a Distributed Hash Table (DHT) may be used to store the translation state across the plurality of service nodes. Each DHT entry may map each flow identified by the corresponding 5-tuple with the translated pair {Translated_IP_address(F), Translated_Port(F)} and the NAPT service node owning the flow. Upon flow migration, management function 30 may update the relevant DHT entry and send various notifications as appropriate to the associated NAPT service nodes.

In some embodiments, the flow migration from one NAPT service node (e.g., 26(A)) to another (e.g., 26(B)) may take place with direct signaling between source NAPT service node (e.g., 26(A)) and destination NAPT service node (e.g., 26(B)) without relying on any external function. The enablement of flow migration from one NAPT service node (e.g., 26(A)) to another (e.g., 26(B)) can be used to implement additional features such as High Availability mechanism between NAPT service nodes. For example, when one NAPT service node fails, another NAPT service node can take its place by becoming owner of the flows previously assigned to the failed NAPT service node. Another example includes elastic NAPT service; when a first NAPT service node is fully loaded, a parallel second NAPT service node can be added to manage a portion of the flows managed by the first NAPT service node. According to various embodiments, the translation state may be moved from one NAPT service node to another, which in turn can allow a flow to be moved from one NAPT service node to another (and thus from one service chain to another).

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, service nodes 24(A1), 24(A2), 24(B1), 24(B2), 26(A), 26(B), etc. can comprise physical service appliances (e.g., stand-alone boxes) plugged into network 12 appropriately. In other embodiments, service nodes 24(A1), 24(A2), 24(B1), 24(B2), 26(A), 26(B), etc. can comprise service cards attached internally within another network element, such as a router or switch in network 12. In yet other embodiments, service nodes 24(A1), 24(A2), 24(B1), 24(B2), 26(A), 26(B), etc. can comprise virtual applications executing on suitable network elements (e.g., servers, switches, routers, etc.) in network 12. In some embodiments, service nodes 24(A1), 24(A2), 24(B1), 24(B2), 26(A), 26(B), etc. can comprise a combination of the above.

In various embodiments, flow classifiers 18 and 22 may comprise applications executing on suitable network elements to perform their respective operations. In some embodiments, pool manager 28 may comprise an application executing on an external network element (e.g., external to service chains 20(A), 20(B), etc.); in other embodiments, pool manager 28 may comprise a distributed application executing in a plurality of NAPT service nodes (e.g., 26(A), 26(B), etc.) or on other service nodes, for example, executing concurrently with service nodes 24(A1), 24(A2), 24(B1), 24(B2), 26(A), 26(B), etc. In some embodiments, pool manager 28 may comprise a stand-alone box including the application configured to execute the operations described herein. Note that any suitable number of flow classifier 22 may be instantiated in network 12 within the broad scope of the embodiments.

Client 14 may represent any suitable network endpoint. In various embodiments, client 14 may comprise separate computing devices running applications (e.g., server/client applications in client-server network architecture). In other embodiments, client 14 may comprise separate virtual machines on the same or different computing devices (e.g., server blades in a data center). In some embodiments, client 14 may include server blades configured in one or more chassis. In yet other embodiments, client 14 may represent a mobile device, such as a cellular phone, laptop, tablet, or smartphone.

In various embodiments, client 14, flow classifiers 18 and 22, and service nodes 24(A1), 24(A2), 24(B1), 24(B2), 26(A), 26(B), etc. may be connected in network 12 over a distributed virtual switch, which can include physical and virtual switches and any suitable network element capable of receiving packets, and forwarding packets appropriately in a network environment. Any number of clients and service nodes may be active within network 12 within the broad scope of the embodiments.

Figure 2A:
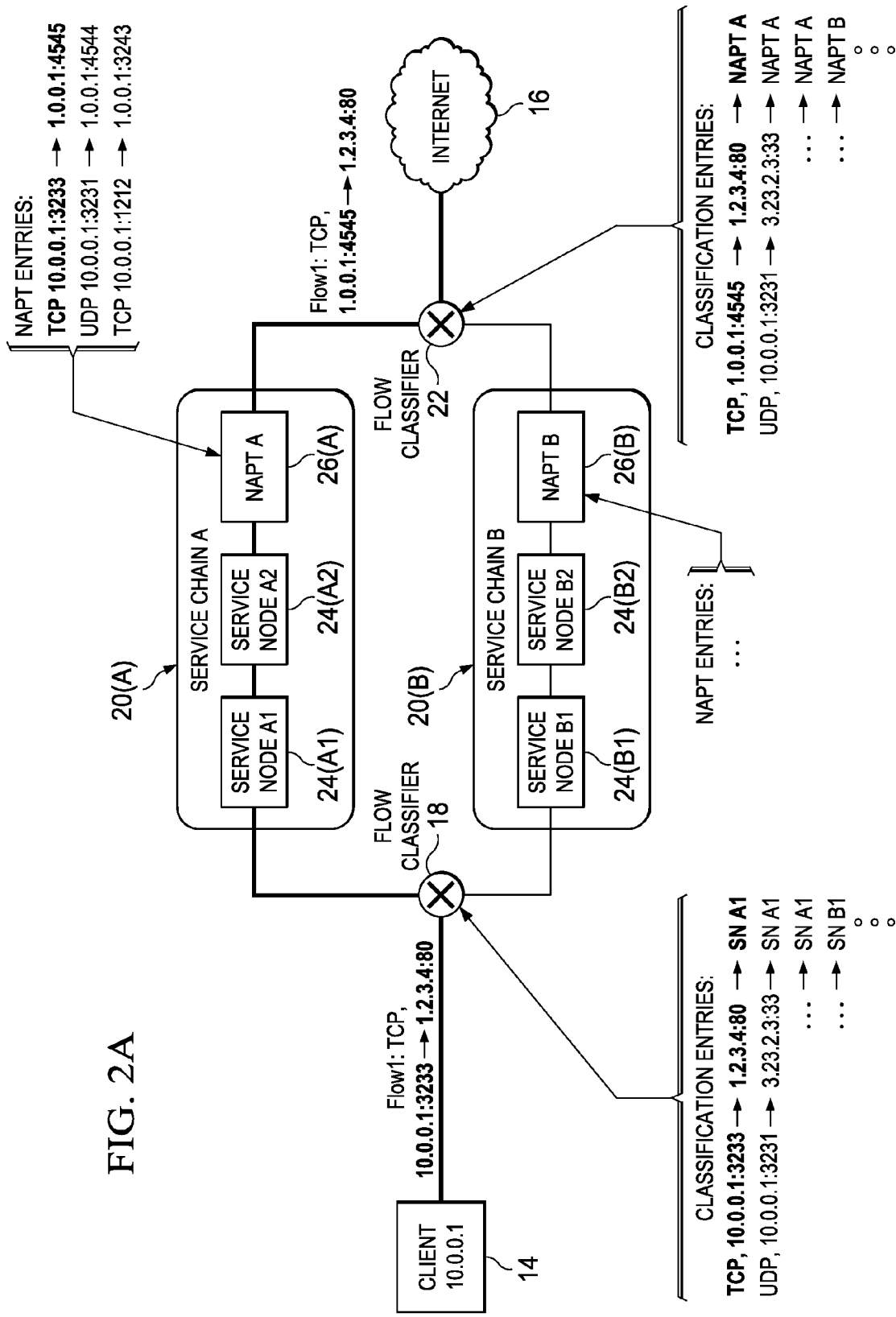
FIG. 2A is a simplified block diagram illustrating example details of embodiments of the communication system.
Figure 2B:
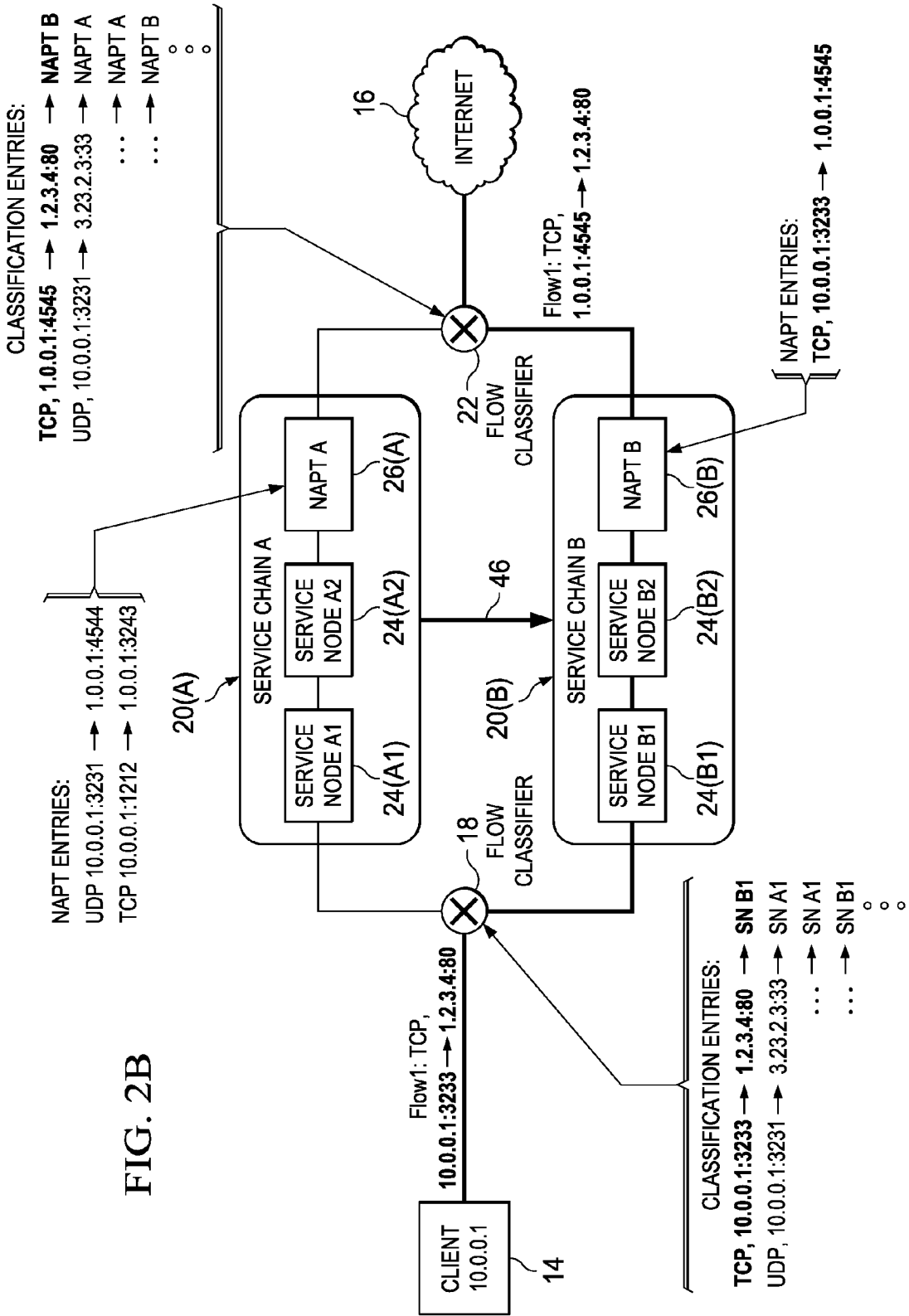
FIG. 2B is a simplified block diagram illustrating example details of embodiments of the communication system.

Turning to FIGS. 2A and 2B, FIGS. 2A and 2B are simplified block diagrams illustrating example details of another embodiment of communication system 10. Assume, merely for example purposes and not as a limitation, that client 14 has a private IP address of 10.0.0.1 within the network, as illustrated in FIG. 2A. Assume that client 14 sends packets destined to IP address and port 1.2.3.4:80 in Internet 16 over port 3233 on Flow 1 using TCP/IP. Flow classifier 18 may be configured to forward packets from IP address and port 10.0.0.1:3233 and destined to 1.2.3.4:80 along service chain 20(A), and thus to service node 24(A1). The packets of Flow 1 may traverse service nodes 24(A1) and 24(A2) and arrive at NAPT service node 26(A). NAPT service node 26(A) may be configured to translate private IP address and port 10.0.0.1:3233 to public IP address and port 1.0.0.1:4545. In some embodiments, the translation state may be assigned to NAPT service node 26(A) by pool manager 28. The packets may be translated accordingly, and forwarded to flow classifier 22. Flow classifier 22 may be configured to forward return packets from 1.2.3.4:80 destined to 1.0.0.1:4545 towards NAPT service node 26(A).

Assume, merely for example purposes and not as a limitation, that flow 1 is migrated from service chain 20(A) to service chain 20(B), as illustrated by flow migration 46 in FIG. 2B. Management function (e.g., 30) may update flow classifier 18 to forward packets from IP address and port 10.0.0.1:3233 and destined to 1.2.3.4:80 along service chain 20(B), and thus to service node 24(B1). The packets of Flow 1 may traverse service nodes 24(B1) and 24(B2) and arrive at NAPT service node 26(B). Pool manager 28 may assign NAPT service node 24(B) with the translation state for flow 1. Thus, NAPT service node 26(B), rather than NAPT service node 26(A), may be configured to translate private IP address and port 10.0.0.1:3233 to public IP address and port 1.0.0.1:4545. The packets may be translated accordingly, and forwarded to flow classifier 22. Flow classifier 22 may be updated by pool manager 28 to forward return packets from 1.2.3.4:80 destined to 1.0.0.1:4545 towards NAPT service node 26(B).

Figure 3:
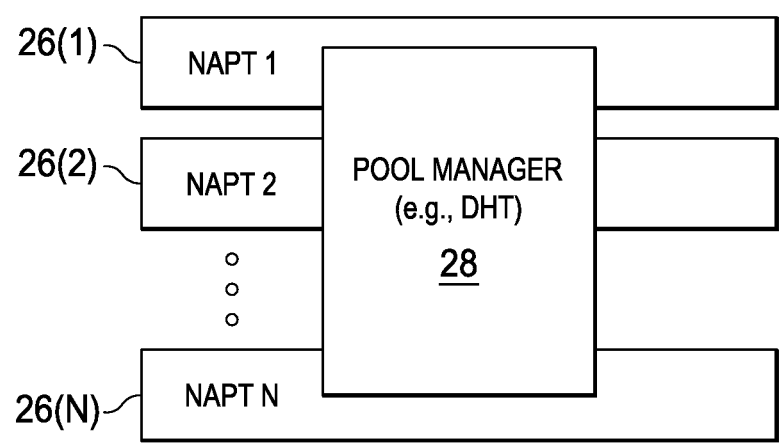
FIG. 3 is a simplified block diagram illustrating other example details of embodiments of the communication system.

Turning to FIG. 3, FIG. 3 is a simplified block diagram illustrating example details of an embodiment of communication system 10. Pool manager 28 may comprise a distributed storage located across a plurality of NAPT service nodes 26(1)-26(N) in network 12. For example, pool manager 28 may comprise a DHT, with each DHT entry associating a specific NAPT service node (e.g., 26($i$)) with a corresponding translation state (e.g., translation tuple). In a general sense, the DHT comprises a class of a decentralized distributed system that provides a lookup service similar to a hash table; (key, value) pairs are stored in the DHT, and any participating NAPT service nodes 26(1)-26(N) can efficiently retrieve the value associated with a given key. In some embodiments, the key can comprise content associating a specific NAPT service node (e.g., 26($i$)) with the corresponding translation state.

Responsibility for maintaining the mapping from keys to values may be distributed among participating NAPT service nodes 26(1)-26(N), where a change in the set of participants causes a minimal amount of disruption. Such an implementation can allows pool manager 28 to scale to large numbers of NAPT service nodes and to handle continual NAPT service node arrivals, departures, and failures. Any suitable structure may be used for the DHT comprising pool manager 28 within the broad scope of the embodiments.

Figure 4:
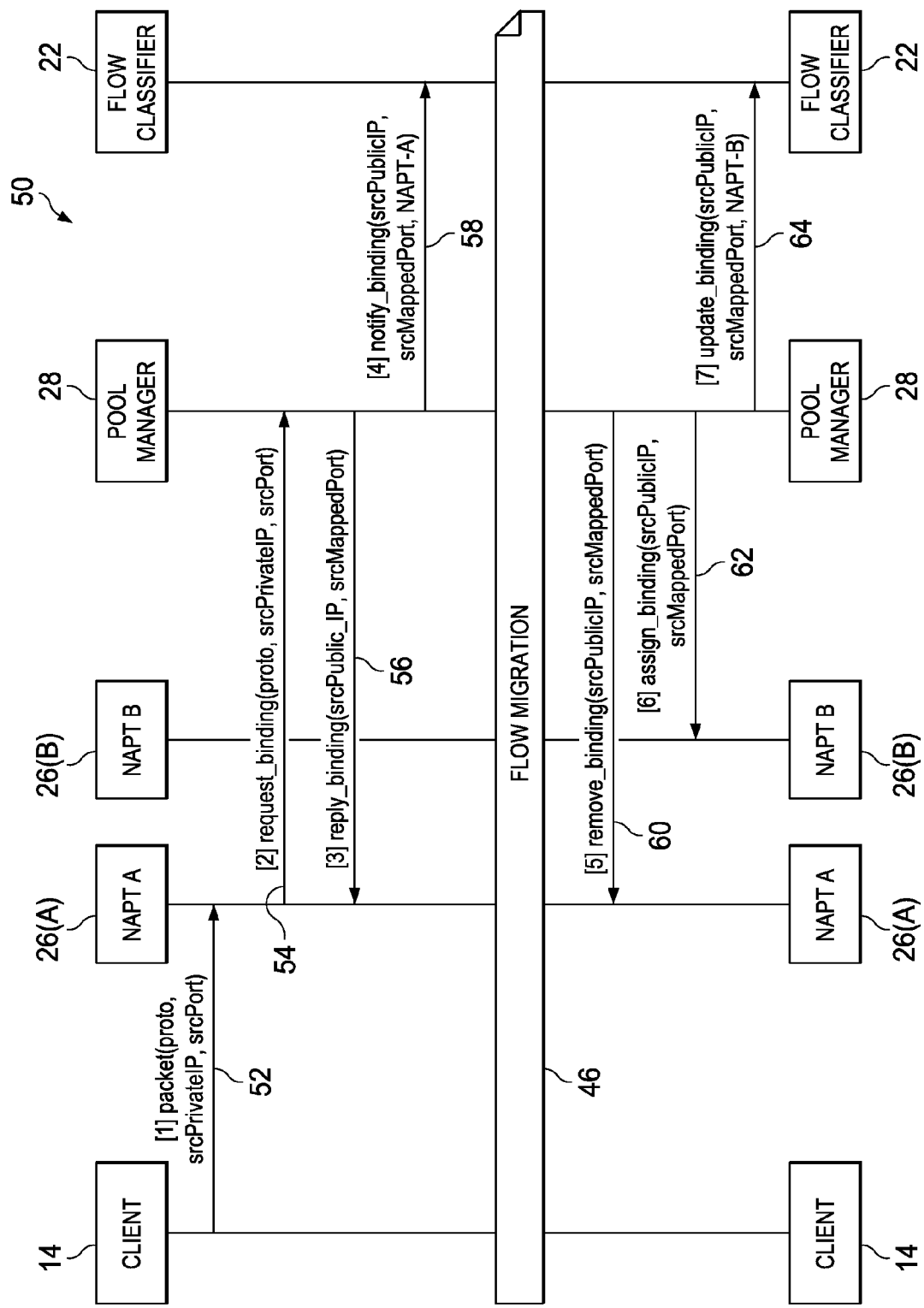
FIG. 4 is a simplified sequence diagram illustrating example operations that may be associated with embodiments of the communication system.

Turning to FIG. 4, FIG. 4 is a simplified sequence diagram illustrating example operations 50 that may be associated with embodiments of communication system 10. At 52, client 14 may send a packet of a flow identified by a specific tuple (e.g., protocol, private source IP address (srcPrivateIP) and private source port (srcPort)) to NAPT service node 26(A). Note that the packet may have traversed one or more other service nodes (e.g., 20(A1), 20(A2), etc.) before arriving at NAPT service node 26(A). At 54, NAPT service node 26(A) may send a request for a translation state associated with the specific flow tuple to pool manager 28. At 56, pool manager 28 may respond with the translation state binding the private source IP address and private source port with a mapped public IP address and port (e.g., {proto, srcPrivateIP, srcPort}→{srcPublicIP srcMappedPort}). At 58, pool manager 28 may notify flow classifier 22 of the association of the flow (e.g., identified by a flow tuple comprising the mapped public IP address) and the service chain comprising NAPT service node 26(A) (e.g., binding(srcPublicIP, srcMappedPort, NAPT-A)).

Flow migration 46 may subsequently be implemented in network 12, migrating packets of the flow from service chain 20(A) to service chain 20(B). At 60, pool manger 28 may remove the translation state from NAPT service node 26(A); at 62, pool manager 28 may assign the translation state to NAPT service node 26(B). At 64, pool manager 28 may update flow classifier 22 of the changed association between the flow and the service chain. For example, the updated entry in the flow classifier's table may comprise a binding associating srcPublicIP and srcMappedPort with NAPT-B.

Figure 5:
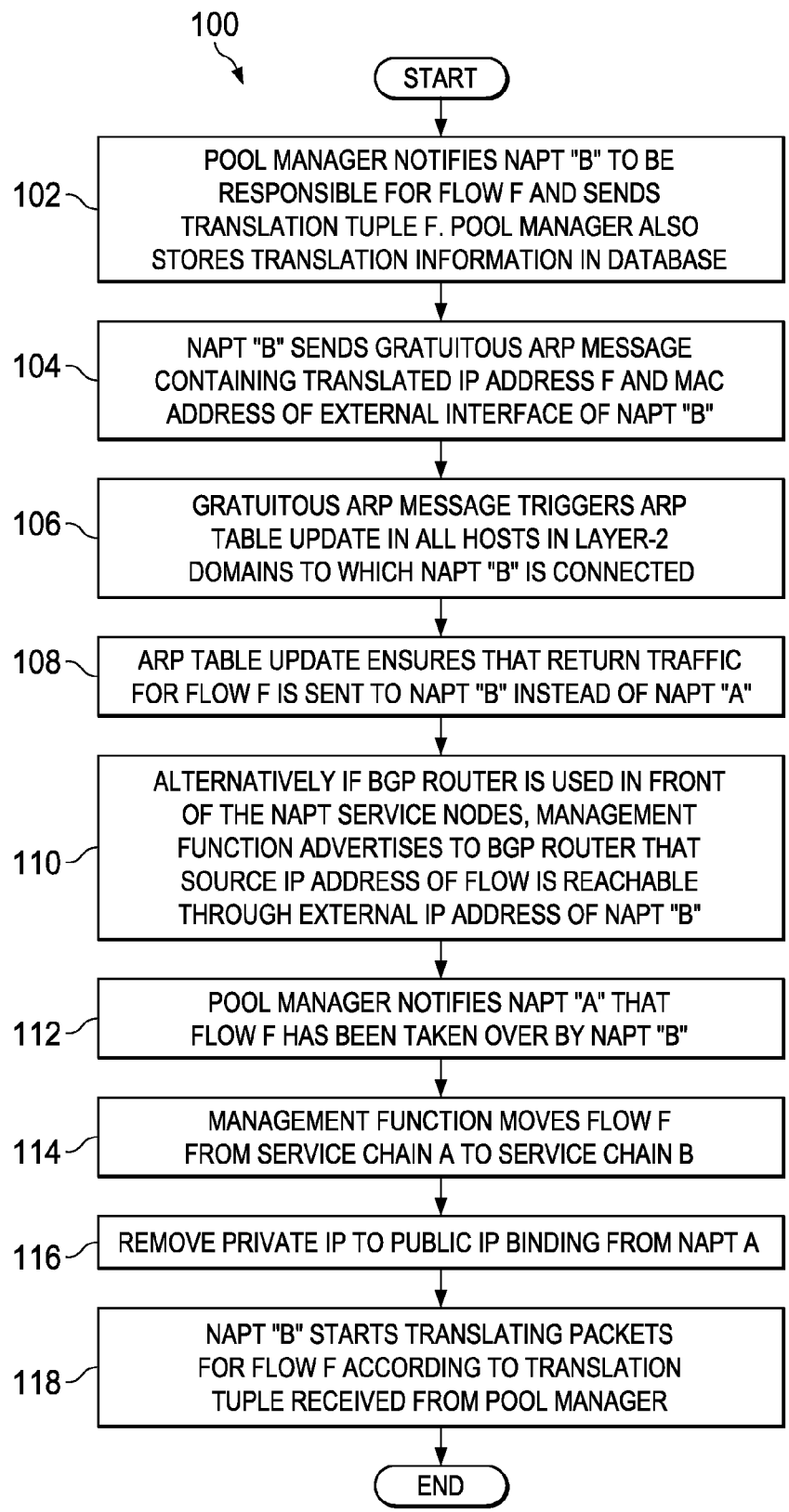
FIG. 5 is a simplified flow diagram illustrating other example operations that may be associated with an embodiment of the communication system.

Turning to FIG. 5, FIG. 5 is a simplified flow diagram illustrating example operations 100 that may be associated with embodiments of communication system 10. At 102, pool manager 28 may notify NAPT service node 26(B) to be responsible for flow F and may send NAPT service node 26(B) the translation state comprising translation tuple F. Pool manager 28 may also store the translation state in its local database (e.g., NAPT information 36). At 104, NAPT service node 26(B) may send a GARP message containing translated IP address and MAC address of its external interface. At 106, the GARP message may trigger an update of the ARP table in all hosts in the L2 domain to which NAPT service node 26(B) is connected. At 108, the ARP table updates may ensure that return traffic for flow F is sent to NAPT service node 26(B) instead of NAPT service node 26(A).

At 110, alternatively, if BGP routers are used in front of the NAPT service nodes, management function 30 may advertise to the BGP routers that the source IP address of the flow is reachable through the external IP address of NAPT service node 26(B). At 112, pool manager 28 may notify NAPT service node 26(A) that flow F has been taken over by NAPT service node 26(B). At 114, management function 30 may move the flow from service chain 20(A) to service chain 20(B). At 116, pool manager 28 may remove private IP address/port binding to public IP address/port from NAPT service node 26(A). At 118, NAPT service node 26(B) may start translating packets for the flow according to the translation state (e.g., translation tuple) received from pool manager 28.

Figure 6:
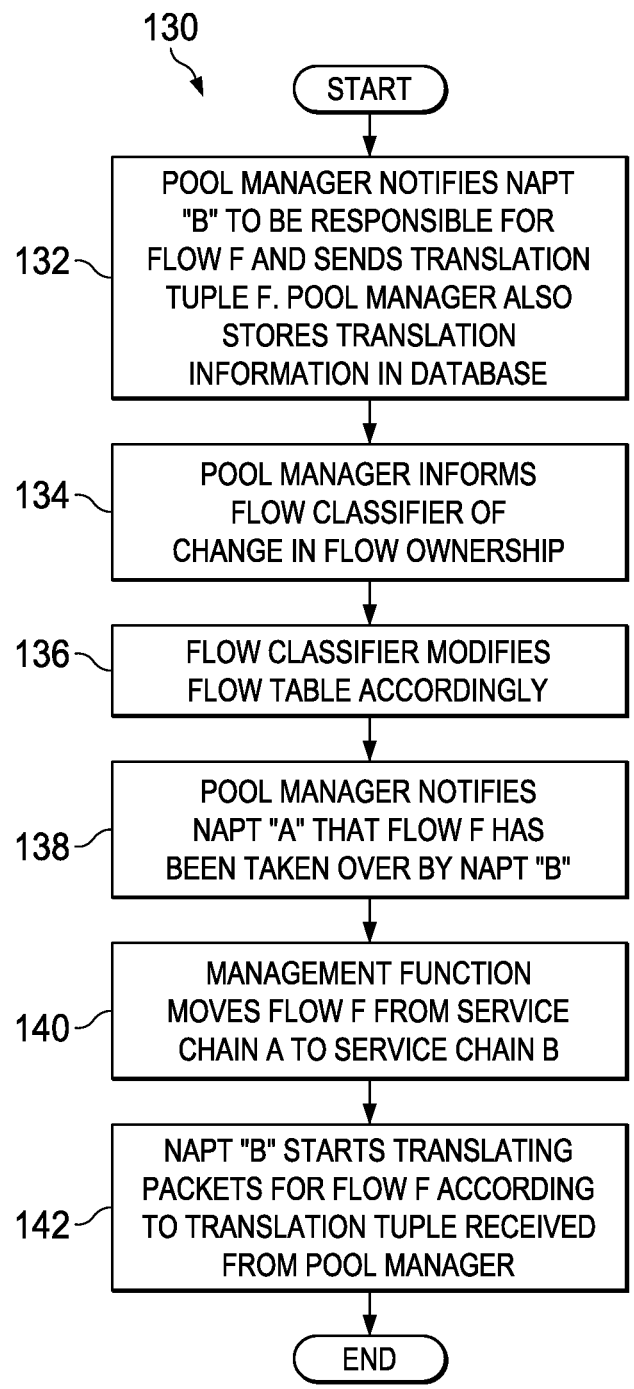
FIG. 6 is a simplified flow diagram illustrating yet other example operations that may be associated with an embodiment of the communication system.

Turning to FIG. 6, FIG. 6 is a simplified flow diagram illustrating example operations 130 that may be associated with embodiments of communication system 10. At 132, pool manager 28 may notify NAPT service node 26(B) to be responsible for flow F and may send NAPT service node 26(B) the translation state comprising translation tuple F. Pool manager 28 may also store the translation state in its local database (e.g., NAPT information 36). At 134, pool manager 28 may inform flow classifier 22 of the change in flow ownership. At 136, flow classifier 22 may modify its flow table accordingly. At 138, pool manager 28 may notify NAPT service node 26(A) that flow F has been taken over by NAPT service node 26(B). At 140, management function 30 may move the flow from service chain 20(A) to service chain 20(B). At 142, NAPT service node 26(B) may start translating packets for the flow according to the translation state (e.g., translation tuple) received from pool manager 28.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, pool manager 28. In some embodiments, one or more of these features may be implemented in hardware, provided external to these elements, or consolidated in any appropriate manner to achieve the intended functionality. The various network elements (e.g., pool manager 28) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, pool manager 28 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 32) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 34) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a pool manager in a network, comprising:
   distributing translation state for a flow traversing the network across a plurality of network address and port translation (NAPT) service nodes in the network with packets belonging to the flow being translated according to the translation state, the translation state comprising a mapping between a local address and port before translation to a global address and port after translation;
   associating the flow with a first service chain at a flow classifier in the network;
   updating the association when the flow migrates from the first service chain to a second service chain with packets belonging to the migrated flow also being translated according to the translation state, wherein the first service chain comprises a first NAPT service node and the second service chain comprises a different second NAPT service node, the first NAPT service node and the second NAPT service node translating packets of the flow according to the translation state;
   receiving a query from the first NAPT service node about an owner of the flow after the flow migrates, wherein the first NAPT service node receives a packet of the migrated flow; and
   responding to the query with an identity of the second NAPT service node, wherein the first NAPT service node forwards the packet of the migrated flow directly to the second NAPT service node.

2. The method of claim 1, wherein the association comprises a first association between the flow and the first service chain before the flow migrates, wherein updating the association comprises changing the first association to a second association between the flow and the second service chain after the flow migrates.

3. The method of claim 2, wherein the distributing comprises:
   storing the translation state in a storage external to the service chains; and
   assigning the translation state to the first NAPT service node before the flow migrates, and to the second NAPT service node after the flow migrates.

4. The method of claim 2, wherein the flow classifier receives packets of the flow incoming into the network, wherein the packets are forwarded by the flow classifier to the first NAPT service node according to the first association before the flow migrates, and to the second NAPT service node according to the second association after the flow migrates.

5. The method of claim 1, wherein the translation state further comprises translation of a private IP address and port to a public IP address and port and vice versa.

6. The method of claim 5, wherein the flow is identified at the flow classifier according to a 5-tuple comprising the public IP address and port.

7. The method of claim 1, wherein the flow classifier comprises a table of classification entries associating flows traversing the network with respective service chains.

8. The method of claim 1, wherein the pool manager comprises a distributed storage located across the plurality of NAPT service nodes.

9. The method of claim 8, wherein the distributed storage comprises a distributed hash table (DHT), wherein each DHT entry maps each flow in the network with a corresponding translated pair of IP address and port and a particular NAPT service node performing the translation.

10. Non-transitory tangible media that includes instructions for execution, which when executed by a processor, is operable to perform operations comprising:
    distributing translation state for a flow traversing the network across a plurality of NAPT service nodes in the network with packets belonging to the flow being translated according to the translation state, the translation state comprising a mapping between a local address and port before translation to a global address and port after translation;
    associating the flow with a first service chain at a flow classifier in the network;
    updating the association when the flow migrates from the first service chain to a second service chain with packets belonging to the migrated flow also being translated according to the translation state, wherein the first service chain comprises a first NAPT service node and the second service chain comprises a different second NAPT service node, the first NAPT service node and the second NAPT service node translating packets of the flow according to the translation state;
    receiving a query from the first NAPT service node about an owner of the flow after the flow migrates, wherein the first NAPT service node receives a packet of the migrated flow; and
    responding to the query with an identity of the second NAPT service node, wherein the first NAPT service node forwards the packet of the migrated flow directly to the second NAPT service node.

11. The media of claim 10, wherein the association comprises a first association between the flow and the first service chain before the flow migrates, wherein updating the association comprises changing the first association to a second association between the flow and the second service chain after the flow migrates.

12. The media of claim 11, wherein the distributing comprises:
    storing the translation state in a storage external to the service chains; and
    assigning the translation state to the first NAPT service node before the flow migrates, and to the second NAPT service node after the flow migrates.

13. The media of claim 11, wherein the flow classifier receives packets of the flow incoming into the network, wherein the packets are forwarded by the flow classifier to the first NAPT service node according to the first association before the flow migrates, and to the second NAPT service node according to the second association after the flow migrates.

14. The media of claim 10, wherein the processor is associated with a pool manager comprising a distributed storage located across the plurality of NAPT service nodes.

15. An apparatus, comprising:
    a memory element for storing data; and
    a processor, wherein the processor executes instructions associated with the data, wherein the processor and the memory element cooperate, such that the apparatus is configured for:
        distributing translation state for a flow traversing the network across a plurality of NAPT service nodes in a network with packets belonging to the flow being translated according to the translation state, the translation state comprising a mapping between a local address and port before translation to a global address and port after translation;
        associating the flow with a first service chain at a flow classifier in the network; and
        updating the association when the flow migrates from the first service chain to a second service chain with packets belonging to the migrated flow also being translated according to the translation state, wherein the first service chain comprises a first NAPT service node and the second service chain comprises a different second NAPT service node, the first NAPT service node and the second NAPT service node translating packets of the flow according to the translation state;
        receiving a query from the first NAPT service node about an owner of the flow after the flow migrates, wherein the first NAPT service node receives a packet of the migrated flow; and
        responding to the query with an identity of the second NAPT service node, wherein the first NAPT service node forwards the packet of the migrated flow directly to the second NAPT service node.

16. The apparatus of claim 15, wherein the association comprises a first association between the flow and the first service chain before the flow migrates, wherein updating the association comprises changing the first association to a second association between the flow and the second service chain after the flow migrates.

17. The apparatus of claim 16, wherein the distributing comprises:
    storing the translation state in a storage external to the service chains; and
    assigning the translation state to the first NAPT service node before the flow migrates, and to the second NAPT service node after the flow migrates.

18. The apparatus of claim 16, wherein the flow classifier receives packets of the flow incoming into the network, wherein the packets are forwarded by the flow classifier to the first NAPT service node according to the first association before the flow migrates, and to the second NAPT service node according to the second association after the flow migrates.

19. The apparatus of claim 15, wherein the apparatus includes a pool manager that comprises a distributed storage located across the plurality of NAPT service nodes.

* * * * *